W. B. THOMAS, Jr.
CONTAINER.
APPLICATION FILED OCT. 4, 1920.
1,387,520.
Patented Aug. 16, 1921.
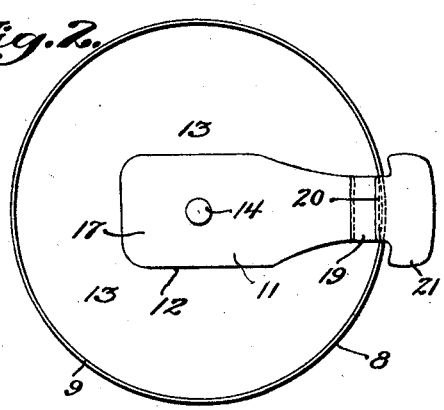
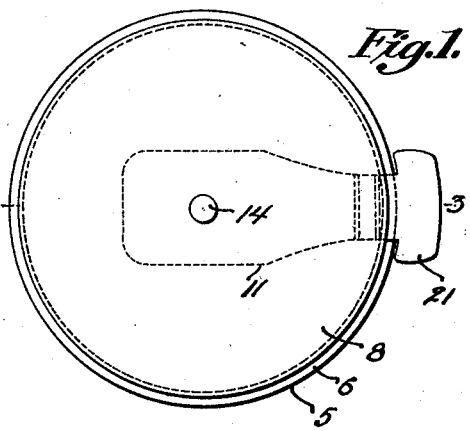
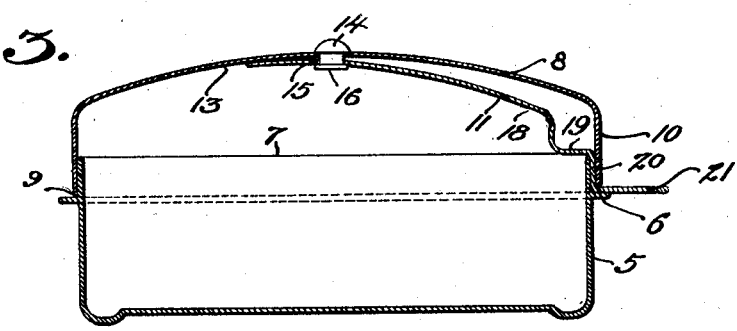
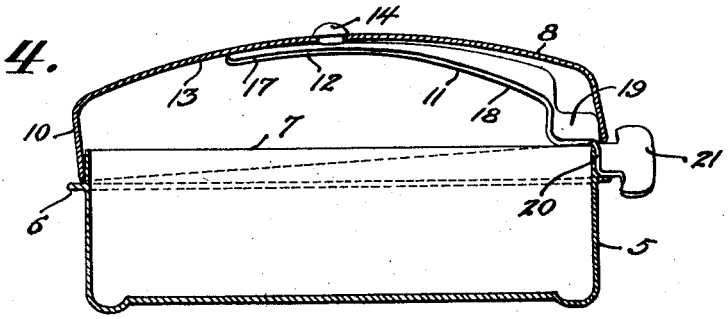
Witnesses
Edward F. Wendig
Augustus B. Copper
Inventor,
William B. Thomas Jr.
by, Joshua R. H. Potts
his Attorney

UNITED STATES PATENT OFFICE.

WILLIAM B. THOMAS, JR., OF PHILADELPHIA, PENNSYLVANIA.

CONTAINER.

1,387,520. Specification of Letters Patent. Patented Aug. 16, 1921.

Application filed October 4, 1920. Serial No. 414,417.

*To all whom it may concern:*

Be it known that I, WILLIAM B. THOMAS, Jr., a citizen of the United States, residing at Philadelphia, in the county of Philadelphia and State of Pennsylvania, have invented certain new and useful Improvements in Containers, of which the following is a specification.

One object of my invention is to provide an improved can or other container which will include means whereby the lid thereof can be easily and quickly removed even though the lid tightly fits the body portion of the container.

Another object is to so construct my invention that the same means which is operative to remove the lid will also be operative to cut a seal, if such exists between the lid and the body portion.

Numerous devices for the above purpose have been made prior to my present invention in which parts which protrude from the container can be operated to remove the lid, but the structure is such that a direct prying action is only imparted to one side of the lid which renders the removal of the lid difficult and often results in the permanent bending of the lid.

With my improved construction the releasing means for the lid operates in a novel manner both to pry off the lid adjacent the edge of the body portion and also to engage the upper portion of the lid in such manner as to cause the lid to be readily removed from the body portion.

Another object is to make my invention of a simple and durable construction which can be quickly and easily manufactured.

These objects, and other advantageous ends which will be described hereinafter, I attain in the following manner, reference being had to the accompanying drawings in which Figure 1 is a top plan view of a container made in accordance with my present invention, Fig. 2 is an inverted plan view of the lid of the container showing my invention pivotally attached thereto, Fig. 3 is a central sectional elevation taken on the line 3—3 of Fig. 1 drawn on an enlarged scale and showing the parts in their normal position, and Fig. 4 is a view of similar character to Fig. 3 showing the lid in the act of being removed from the body portion.

Referring to the drawings, 5 represents the body portion of a container which may be of any type open at its top and having an annularly projecting flange 6 below its top edge 7. A lid 8 is adapted to fit the top of the body portion and has a lower edge 9 at the bottom of its skirt portion 10; said skirt portion being adapted to surround the body portion 5 as clearly shown in Fig. 3.

A seal cutting and lid-removing strip plate 11 has a wide end portion 12 which is adapted to engage the upper inner surface 13 of the lid 8. A pivot pin 14 extends axially through the lid 8 and through a hole 15 in the portion 12 of the plate 11 as clearly shown in Figs. 2 and 3. This pin 14 is riveted or provided with heads at its opposite ends; the inner head 16 being preferably slightly larger than the hole 15. The arrangement is such that there is a part 17 of the portion 12 of the plate 11 which extends beyond the pin 14 and this part 17 serves as an auxiliary prying lever during the removal of the lid as will be hereinafter described.

The strip plate 11 from the portion 12 has a part 18 which extends downwardly at a slant and is provided with a step portion 19 which is adapted to extend over the top edge 7 of the body portion 5 and then downwardly by the part 20 between the outer surface of the body portion 5 and the skirt portion 10 of the lid 8. This part 20 is then bent outwardly between the flange 6 of the body portion 5 and the lower edge 9 of the lid 8 so as to provide a T-shape head 21 which may be readily grasped by the fingers. The strip plate 11 is preferably made of very thin sheet metal of a resilient character such as sheet spring steel and it is obvious that if there is any seal, such as a covering of paper, wax, fiber or any other material, between the lid and the body portion that said seal can be cut by rotating the strip 11 on the pin 14 as a pivot and the part of the strip plate 11 which projects outwardly between the flange 6 of the body portion and the lower edge 9 of the lid will serve as a knife to cut said seal. When it is desired to remove the lid it is merely necessary to grasp and twist the T-shape head 21 and in so doing the inner part of the head 21 will engage and lift the edge 9 of the lid and the part 20 of the plate 11 will also serve to slightly bend the skirt portion 10 outwardly to free it from the body portion throughout a part of its circumference and during this action the part 17 of the plate at a position at the other side of the pivot pin 14 will serve as a lever upon the surface 13 of the lid to effect a direct lifting action at a part diametrically opposite the step portion 19 so that the lid will be bodily raised. This lever action of the part 17 of the plate 11 is assisted due to the resilient characteristic of the strip plate 11 throughout the length of the part 18 so that instead of depending entirely on the inner part of the head 21 while removing the head, the portion 12 of the plate 11 serves to bodily lift the lid due to its twisting movement into engagement with the surface 13.

It will be understood that my invention can be applied to cans, boxes and containers of various shapes and sizes.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A container including a body portion; a lid for the body portion; a pivot member on said lid; and a strip plate mounted on said pivot member and having a portion engaging the inner surface of the lid and an extended portion protruding out of the container between the lid and the body portion; substantially as described.

2. A container including a body portion and a lid; a pivot member on said lid; and a strip plate mounted on said pivot member and having a portion engaging the inner upper surface of the lid and an opposed portion protruding out of the container between the lid and the body portion, said first portion of the strip plate being relatively wide compared to the pivot whereby a leverage is effected between said latter portion and the lid when the strip is twisted in the direction of its width; substantially as described.

In testimony whereof I have signed my name to this specification in the presence of two subscribing witnesses.

WILLIAM B. THOMAS, Jr.

Witnesses:
CHAS. E. POTTS,
ELIZABETH GARBER.